May 23, 1939.  J. E. TRAINER ET AL  2,159,059
ELECTRIC WELDING
Filed Dec. 28, 1936   6 Sheets-Sheet 1
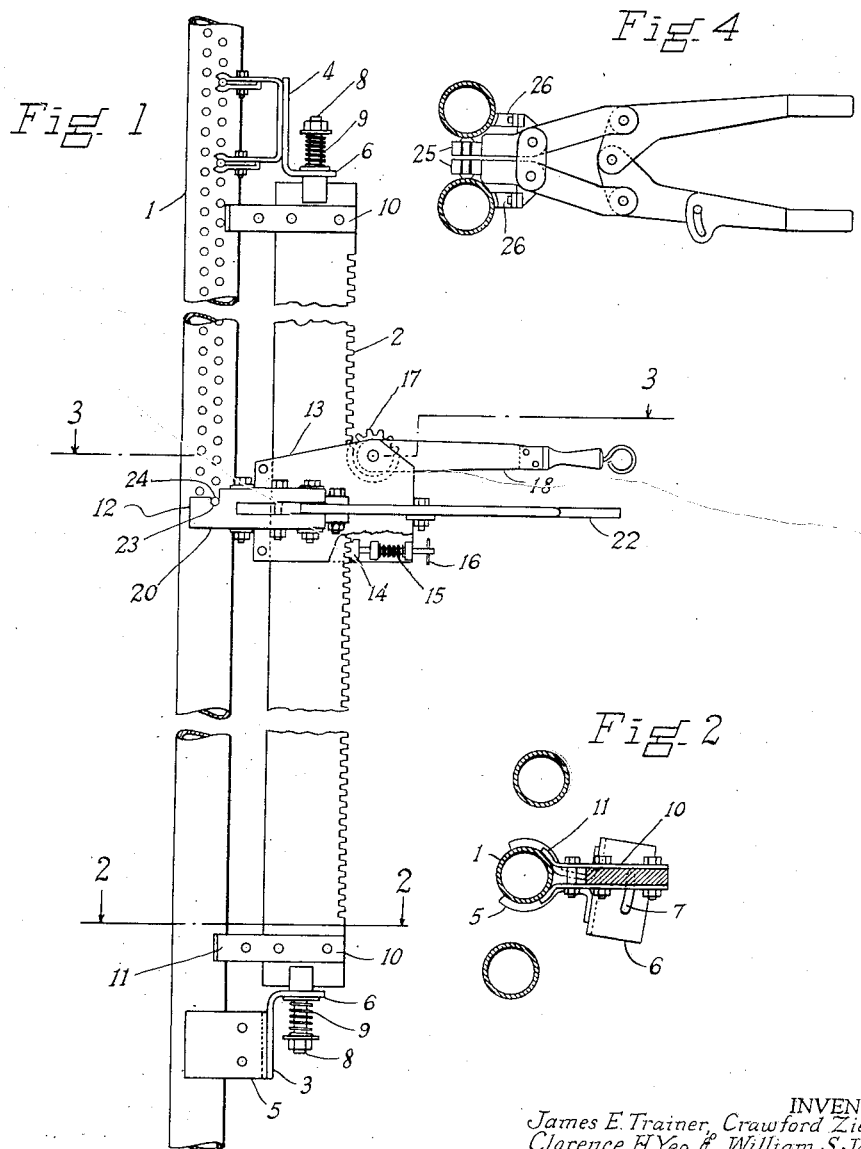
INVENTORS
James E. Trainer, Crawford Ziegler,
Clarence H. Yeo & William S. Jordre.
BY
ATTORNEY.

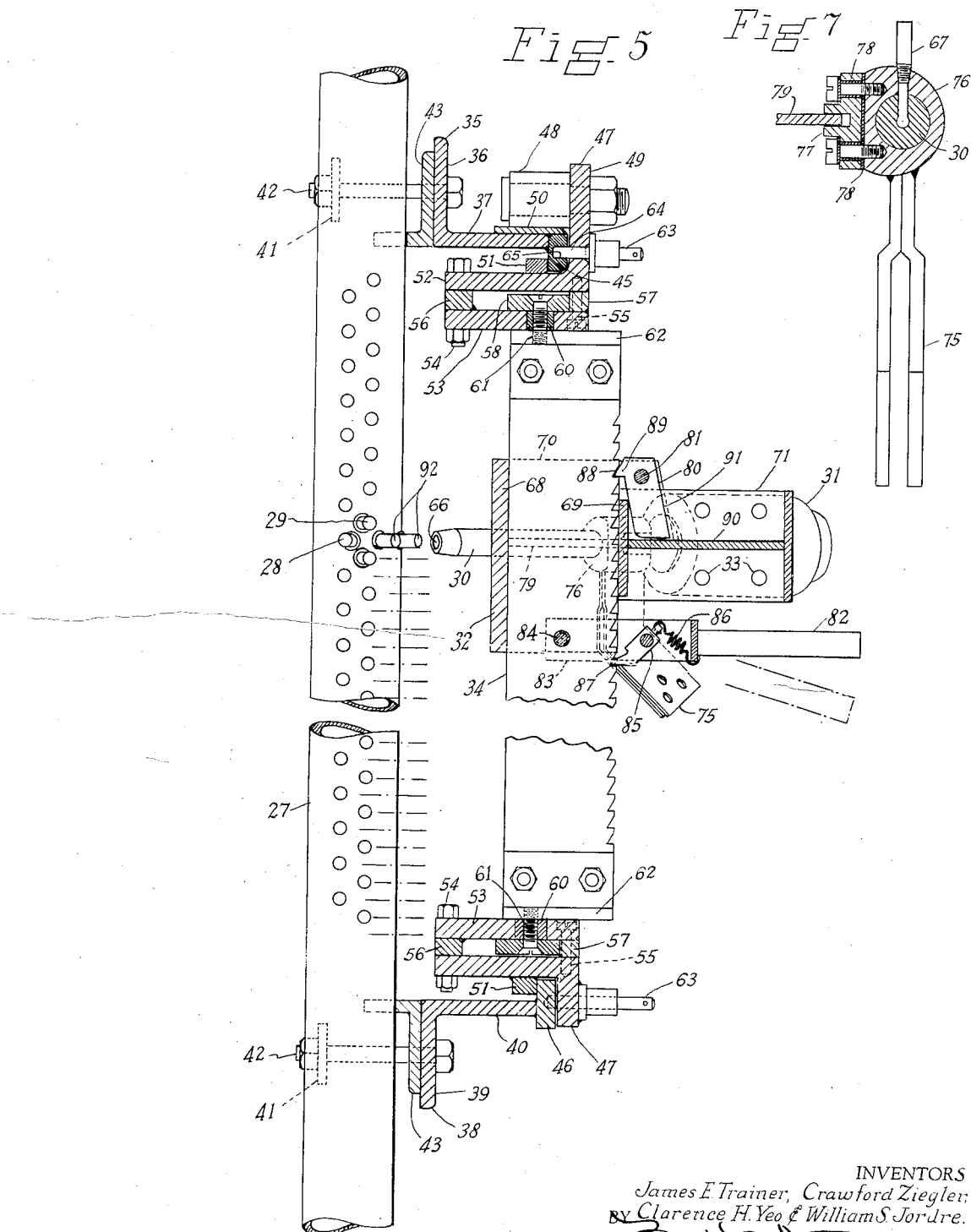

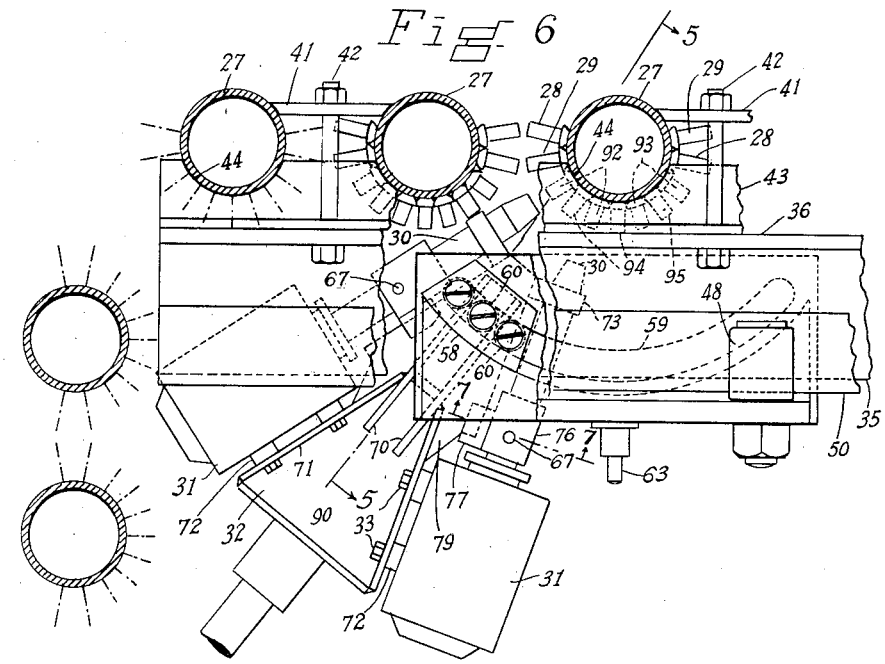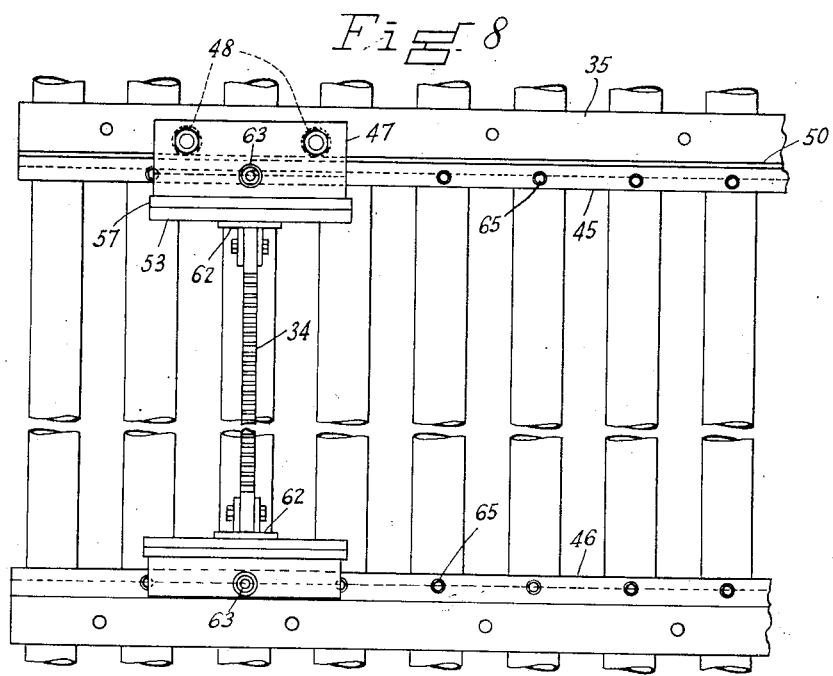

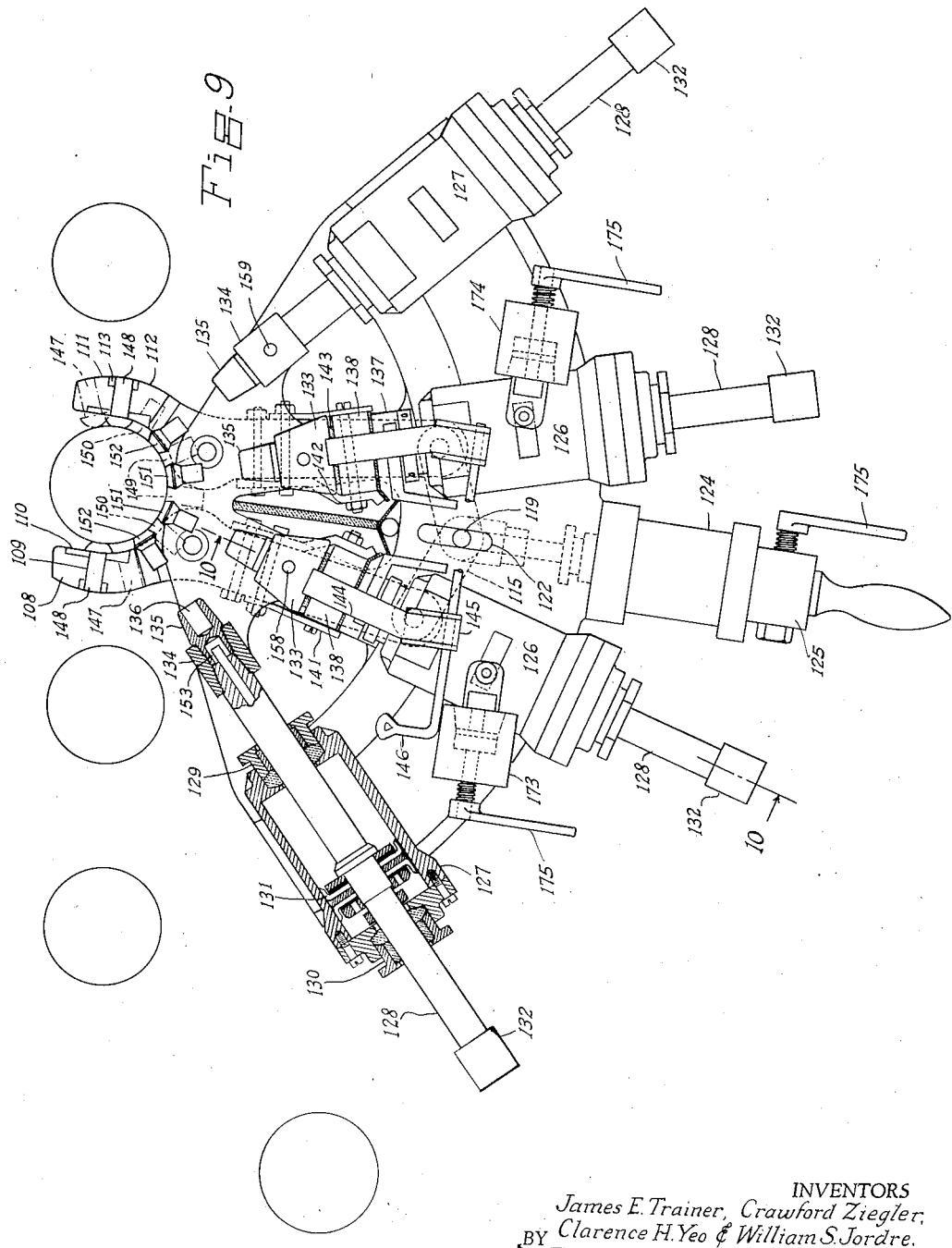

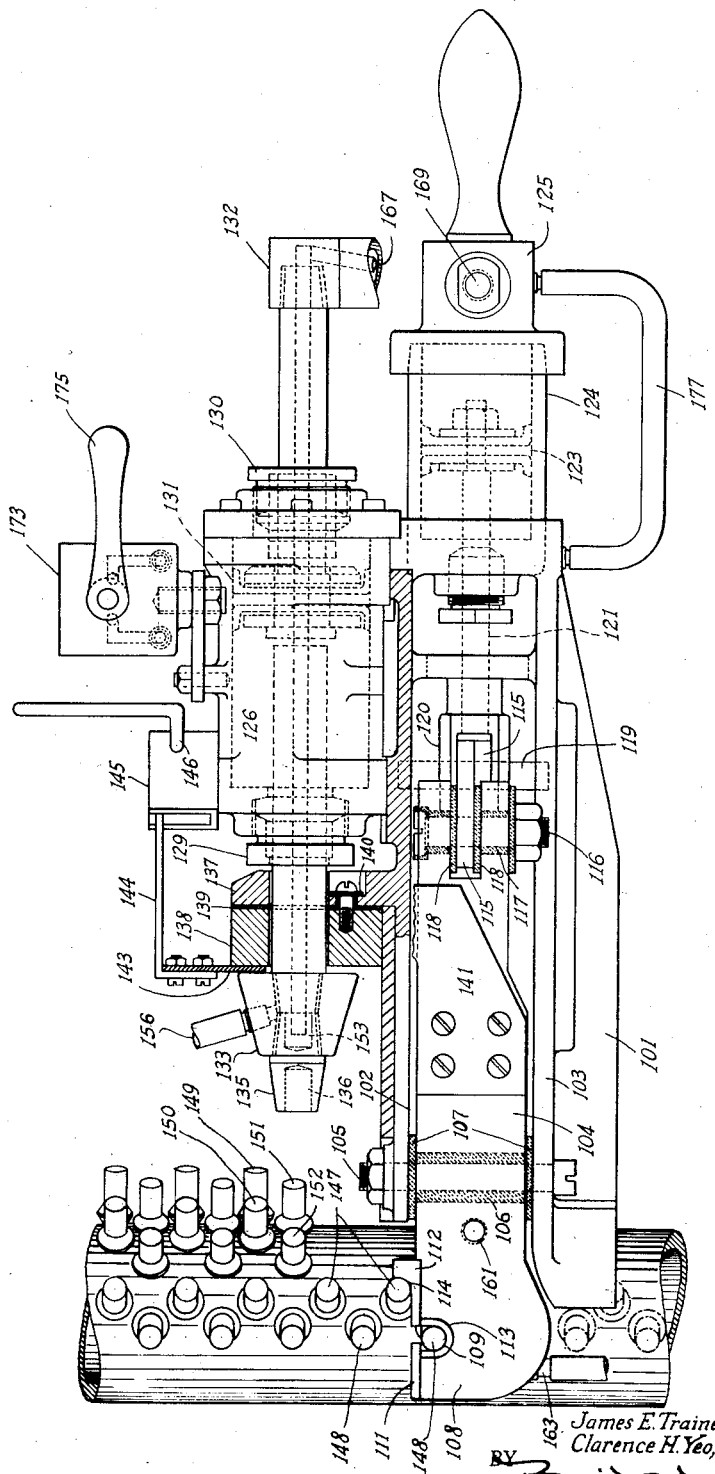

May 23, 1939.　　J. E. TRAINER ET AL　　2,159,059
ELECTRIC WELDING
Filed Dec. 28, 1936　　6 Sheets-Sheet 6
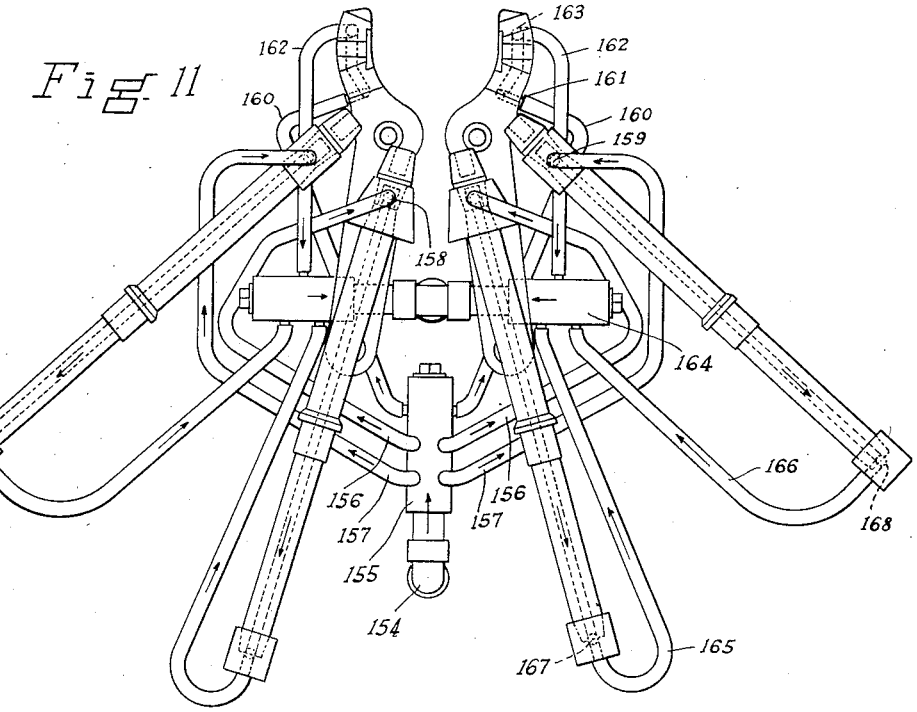
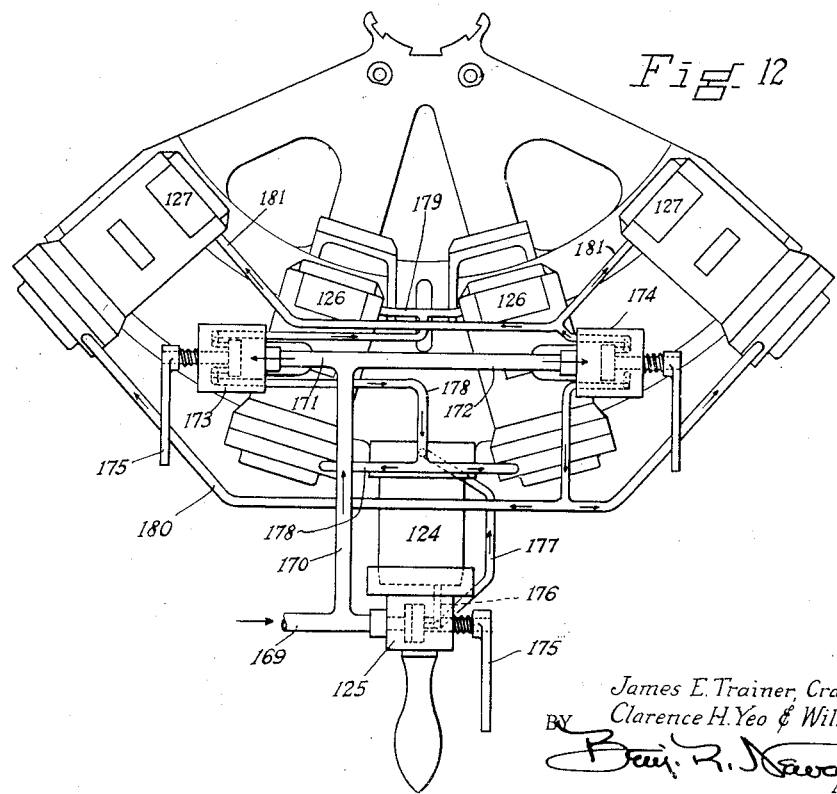
INVENTORS
James E. Trainer, Crawford Ziegler,
Clarence H. Yeo & William S. Jordre
BY
ATTORNEY.

Patented May 23, 1939

2,159,059

UNITED STATES PATENT OFFICE 2,159,059

ELECTRIC WELDING

James E. Trainer, Fairlawn, Crawford Ziegler, Barberton, Clarence H. Yeo, Akron, and William S. Jordre, Barberton, Ohio, assignors to The Babcock & Wilcox Company, Newark, N. J., a corporation of New Jersey Application December 28, 1936, Serial No. 117,776

28 Claims. (Cl. 219—4)

The inventions herein described refer to the application of metallic projections to metallic members and include such apparatus as will find extensive use in the manufacture of fluid carrying tubes, for example, to which metallic projections or studs are automatically welded at predetermined positions along their outer surfaces. Machines have been developed for the welding of metallic projections to tubular members, but in most cases, are designed primarily for shop use, being of such size and weight as to require permanent settings which prohibit their being transported readily from one place to another. In contrast to the massive and permanently located types of apparatus, it becomes desirable to provide machines of a portable nature which can be readily transported from one location to another as the occasion might require; for example, with plain-surfaced tubes or partially studded tubes already installed in a boiler setting, the machines of this invention can be delivered to the field, and the welding of the studs accomplished with the tubes in place without necessitating the delivery of studded tubes from the factory for substitution in the field for the tubes already installed. Notwithstanding the desirability for field use, it will be evident as the description proceeds that the "portable" types of machines are also serviceable for shop use as a replacement for those of the permanently located variety.

An object, therefore, of the invention is to provide a readily transportable apparatus capable of welding studs at various locations on a tube and, in the operation of such apparatus, to automatically establish a predetermined spaced relation between studs successively connected.

Another object is the development of apparatus for the welding of studs at certain locations by means of one series of operations and at other locations by another series, utilizing the initially welded studs as an index for the subsequently applied studs.

A further object is to provide apparatus whereby, with the tube at rest, studs may be secured thereto in spaced relation throughout an area which may exceed one half of the outer wall surface of the tube.

An additional object is in the provision of apparatus for the convenient welding of studs to successive tubes in a group of tubes, fixed in position, which includes guiding and indexing means for the welding device to insure accurate positioning of the studs on each of said tubes.

A complete understanding of the invention, its objects and advantages, will be had from the specification which follows, particularly when read in conjunction with the accompanying drawings which are illustrative of the invention; it being understood that due to the small scale of the drawings, certain elements may not be represented in their exact proportions. The several views of the drawings are briefly described as follows:

Fig. 1 is an elevational view of one form of my invention;

Fig. 2 is a sectional view of Fig. 1 along the line 2—2;

Fig. 3 is a sectional view of Fig. 1 along the line 3—3 which includes a plan view of the welding tool;

Fig. 4 is a sectional view similar to Fig. 3 but illustrating a modified form of welding tool;

Fig. 5 is an elevational view partly in section showing another embodiment of the invention, the sectionalized portion including a view of the welding tool frame along the line 5—5 of Fig. 6;

Fig. 6 is a plan view of Fig. 5, partly broken away;

Fig. 7 is a detail section taken along the line 7—7 of Fig. 6;

Fig. 8 is a front elevation of parts shown in Figs. 5 and 6, but omitting the welding tool and its supporting frame;

Fig. 9 is a plan view of a further modification, including a central section through one of the pneumatic cylinders;

Fig. 10 is an elevational view of Fig. 9, including a partial section along line 10—10;

Figs. 11 and 12 are plan views showing water and air connections, respectively, applied to the form illustrated in Fig. 9.

The form of apparatus shown in Figs. 1 to 4 inclusive, is particularly adapted to the welding of studs to the tubes in substantially opposed longitudinal rows. The tubes are indicated by reference character 1, the plan view, Fig. 3, diagrammatically indicating several tubes arranged in a row as they might be installed, for example, in a furnace wall. A rack 2 is mounted on one of the tubes by means of a clamp support 3 at the bottom and a second support 4 at the top. The upper support 4 requires that certain studs or projections be previously secured to the tube and in order to accomplish this by means of the tool described, the rack 2 may be initially supported at the top by duplicating support 3 for the upper end until a sufficient number of studs are welded in place to provide the necessary anchorage for support 4. The support 3 includes open ended clamp 5 to engage the tube 1, and an angle 6 having its horizontally disposed leg provided with an arcuate slot 7 for angular adjustment of the rack position. The upper support 4 includes an angle 6 corresponding to angle 6 of the bottom support and similarly provided with a slot for angular adjustment of the rack. The rack is mounted on the angles 6 by means of studs 8, top and bottom, which are secured to the rack at its ends and are received in the slots 7. The springs 9 serve to clamp the rack in the desired position, but a more positive locking means may be provided, if desired, to hold the rack against angular displacement. Plates 10 secured to the rack and bent at their free ends 11 to fit the tube, serve as spacers and guides to maintain the proper working distance between the rack and the tube at all times.

The welding tool 12 is carried in a frame 13 which is so formed that it may be moved up and down along the rack 2. The frame is locked in the desired position by the toothed-block 14 held in place by a spring 15 and any change from this position is obtained by pulling out on the handle 16 to release the block 14 and rotating the pinion 17 through the proper angle, whereupon the block 14 is reseated in some succeeding position on the rack. The pinion 17 is mounted in the frame 13 and rotated by means of the handle 18 through a latch-block connection between the handle and pinion operable somewhat in the manner of block 14 and resiliently held in engagement with the pinion teeth by means of spring 19.

The welding tool 12 is in the form of contracting tongs whose jaws 20 span the tube and are actuated through a simple toggle mechanism which includes links 21 and handles 22. The jaws 20 constitute the electrodes of the welding tool and, being suitably insulated from each other, are connected to the terminals of an electric welding circuit such as disclosed in U. S. Patent 2,003,320 to J. E. Trainer et al., and described with reference to Fig. 6 thereof. The jaws are provided with recesses 23 in their upper sides to receive the extensions or studs 24 which are clamped against the tube when the jaws are contracted, and held in contact with the tube while the current is applied to cause the extensions or studs to be welded to the tube at diametrically opposed positions. The circuit is then broken, the pressure on the jaws released, new studs inserted in the recesses 23 and the tool moved to a desired succeeding position on the rack for the application of additional studs in a similar manner. It will be noted that with this form of device the curved slots 7 provide for angular adjustment of the rack and tool so that the diametrically opposed studs at one level can be arranged at an angle to the diametrically opposed studs at another level, thus permitting the arrangement of the studs in staggered formation along the side of the tube, as indicated in Figure 1.

Additional support may be provided for the welding tool and its frame which may conveniently be a cable suspension and include some simple and well-known counter-balancing feature.

Fig. 4 shows a modified form of welding tool in which the electrodes are expanded to force the studs against the tubes, instead of being contracted as is the case with the form in Fig. 3. As shown, the device is not entirely interchangeable with the form of tool illustrated in Fig. 3 for use with the rack bar but is readily adaptable for such use and will serve to illustrate a variation in the form of tool sometimes required for special service where space conditions might not permit the convenient use of the contracting type. In the expanding form of tongs the electrodes are indicated at 25, and blocks 26 contact adjacent tubes to provide the proper setting for the tool with respect to the work.

Figs. 5 and 6 show a modified form of the invention for the welding of studs to the "front" or "face" of a tube as contrasted with the diametrically opposed side positions referred to in connection with Figs. 1 to 4 inclusive. With a row of tubes 27 arranged according to Fig. 6, in a furnace wall for example, the rows of side studs 28 and 29 may be applied by means of the previously described apparatus whereas the face studs intermediate those positions may be applied by means of the device now being described. The tool comprises a pair of pneumatically operated electrodes 30 forming extensions of the piston rods of air cylinders 31. The cylinders are secured to the frame 32 by means of bolts 33, and the frame slidably mounted on ratchet bar 34 which thus serves as a support and guide for the electrodes in their movement relative to the work. The ratchet bar is removably secured to the tubes 27 through top and bottom supports which include groups of parts fixed to the tubes and other groups movable with the ratchet bar. The fixed groups serve as rails which support and guide the rack and welding tool for movement into successive positions across the row of tubes. The movable groups form a part of the rack assembly and provide the necessary supports between the rack and the rail groups, including parts which permit angular adjustment of the electrodes with respect to the tubes.

The upper stationary support includes an angle 35 of a length sufficient to span a plurality of tubes in the row and with one leg 36 extending parallel to the tubes 27 and the other leg 37 normal to the tubes. Similarly, the lower stationary support includes the angle 38 with parallel and normally extending legs 39 and 40. The angles 35 and 38 are clamped to the tubes by means of bars 41 and bolts 42 and are maintained at the required working distance from the tubes by means of spacer angles 43 which are interposed between angles 35 and 38 and the tubes, the spacers 43 being recessed at 44 to engage the tubes and thereby insure an accurate setting for related parts of the device during the welding operations. The upper angle 35 has a bar 45 welded to the end of the horizontally disposed leg 37 to form a downwardly extending rail or track as an upper guide for movement of the rack and welding tool into successive positions across the row of tubes. A bar 46 welded to the end of the horizontally disposed leg 40 of angle 38 forms an upwardly extending rail or track for similarly guiding the lower end of the rack.

The upper movable group of rack-supporting members includes the angle 47 in which rollers 48 are mounted near each end of the vertical leg 49 as a suspension support for the ratchet bar, thus permitting free movement of the bar along the track plate 50 which is secured to the horizontal leg 37 of angle 35, when it is desired to shift the welding tool from one operating position to another. A bar 51 is welded to the horizontally disposed leg 52 of angle 47, being spaced from the upwardly extending leg 49 to form a groove for the guide rail 45. A bottom plate 53 is secured to angle 47 by means of bolts 54 and screws 55, being spaced from the horizontally disposed leg 52 by means of bosses 56 and 57 to accommodate the guide plate 58. The bottom plate 53 is provided with a curved slot 59 to receive the plurality of rollers 60 which rotate on screws 61 passing through the plate 58, rollers 60 and into the plate 62 attached to the ratchet bar, thus providing for angular adjustment of the ratchet bar about the center line of a tube as an axis. The inner edge surface of the boss 57 is also curved about the tube axis and is contacted by a correspondingly curved edge surface on the guide plate 58 as the plate is moved from one angular setting to another. The operating position for the ratchet bar and tool opposite any one tube is fixed by an indexing pin 63 which passes through a hole 64 in the movable angle 47 and into a selected hole 65 in the fixed rail bar 45.

The supporting members for the rack at its lower end and which constitute the group that moves with the rack, are similar to those at the upper end and since they function in a similar manner are identified by the same reference characters as the corresponding parts at the upper end. The main distinction is that there are no supports at the lower end corresponding to rollers 48, so that the lower fixed supports take very little if any of the gravity load and function more particularly as guides for the lower end of the rack.

As previously stated, the welding tool is mounted in a frame 32 which is slidably supported on the ratchet bar 34 and carries the symmetrically arranged pneumatic cylinders for operating the electrodes 30 associated therewith, each electrode being cupped at its extremity as shown at 66 for holding a stud. The electrodes are preferably made hollow and water is introduced through inlets 67 for cooling purposes, the water being discharged through the recesses 66, if desired. The frame 32 may conveniently be formed of plate and bar members welded together, the rectangular opening or sleeve through which the ratchet bar passes being defined by the end bars 68 and 69 and side plates 70. Other side plates 71, provide supports for the pneumatic cylinders which are secured by means of the bolts 33 to the plates 71 but insulated therefrom as at 72. The outer end of each electrode is supported in a guide ring 73 which is bolted to the end bar 68 and also insulated from the frame at that point. Electrical contact is made to each electrode through the terminal lug 75 and sleeve 76 which has a flat surface on one side for the attachment of the guide block 77. The block is insulated from the sleeve at 78 and is provided with a slot in its outer face for sliding engagement with the edge of plate 79 which forms a part of supporting frame 32.

The welding tool is locked at the desired position along the ratchet bar 34 by means of the latch 80 pivotally mounted at 81 between the side plates 69 near their upper ends. A ratchet lever 82 having a clevis portion 83 is pivoted at 84 in the side plates 69 and is provided with a pawl 85 which is normally held in engagement with the ratchet teeth by means of the spring 86. When it is desired to shift the position of the welding tool from one level to another, as determined by the locations at which the studs are to be welded, the lever 82 is depressed and with the end 87 of the pawl as a fulcrum the pivoted portion of the lever is moved upwardly and with it the frame 32. As the frame is moved, the latch 80 is rotated in a counterclockwise direction out of engagement with the ratchet bar by the cooperative action between the inclined surface 88 of the rack tooth and the complementary inclined surface 89 at the end of the latch. When the frame is brought to the desired level, the latch returns to its original position by gravity, its clockwise rotation being limited by the horizontal frame plate 90 which acts as a stop for the lower end 91 of the latch, to prevent the latch from moving out of engagement with the ratchet bar.

The construction of the pneumatic cylinders has not been detailed but it will be understood that these are of the well-known type operating under the pressure of the actuating fluid admitted to one or the other side of each piston to cause the advancement or retraction of the welding electrode. The precaution is taken, however, to insulate each piston and piston rod from the cylinder body to prevent the cylinders and the air connections from being included in the welding circuit.

The procedure in welding the face studs to the tube by means of this device is to first assemble the ratchet bar and its supports on the row of tubes and have the welding tool at the lowermost level on the ratchet bar at which it is desired to operate. The ratchet bar 34 is swung to the extreme left hand position, for example, as shown in Fig. 6 for the welding of the pair of studs 92, a suitable clamp or locking means being provided, if necessary, to maintain the ratchet bar at the selected angular setting. A stud is inserted in each of the electrodes, and the electrodes advanced to bring the studs into contact with the tube. The contact is maintained under pressure from the pneumatic cylinders 31 and the proper voltage applied across the electrode terminals 75 which are individually insulated from the frame structure, thus causing a flow of current in the completed welding circuit through the studs and the tube metal in series, and a local heating to the point of fusion where the studs contact the tube to provide a firm welded connection between each stud and the tube. The electrical independence of the electrodes also permits their separate operation, in which case the electrode in circuit is connected to one voltage terminal and the tube to the other terminal. The electrodes are then retracted, new studs inserted, and the process repeated at another location, additional studs such as 93 being welded in the same horizontal row after rotating the ratchet bar through the required angle.

For welding a stud in some higher row the electrodes are shifted to the proper level by manipulation of the ratchet lever 82 as previously described, and the studs 94 welded as before, but preferably at positions staggered with respect to the studs in the lower row, by suitable angular adjustment of the ratchet bar. The cylinders 31 may be operated singly or in multiple, as desired, the choice being governed in part by the number of studs in any one row. For example, one row might contain an even number of studs which could be welded in pairs; another row might contain an odd number of studs and would involve the individual welding of at least one stud such as stud 95, to fill out the row containing studs 94.

The apparatus shown in Figures 9 to 12 inclusive provides a most advantageous arrangement of parts for the welding of both side and face studs, and in a compact unitary assembly includes certain desirable features of the several devices hereinbefore described. A frame 101 which may be a casting of some suitable light-weight metal provides a support for both the side stud welding mechanism and the face stud welding mechanism, the side stud mechanism being located in general between the top plate 102 and bottom plate 103 and the face stud mechanism above the top plate 102. For convenience in manipulating the machine when in use, it may be found desirable to provide a form of counterbalancing suspension for the frame and assembled parts. The side and face stud mechanisms are pneumatically operated and include parts that are water cooled, which features require numerous pipe connections so that for clarity of disclosure the various connections have for the most part been omitted from Figs. 9 and 10 and indicated separately in Figs. 11 and 12 in connection with which they will be described in greater detail.

The side stud welding mechanism includes the electrodes or clamping arms 104 which are pivoted by means of the bolts 105 between the top plate 102 and bottom plate 103, the electrodes being insulated from the frame by means of insulating pieces 106 and 107. The ends of the electrodes form jaws 108 which subtend a portion of the tube circumference and are provided with stud-receiving recesses 109, and at their inner sides with renewable metallic inserts 110 for contact against the underside of the rivet-headed studs. Insulation pieces 111, 112 and 113 are secured to the jaws to prevent burning of the jaws and short circuiting of the welding current through parts other than the studs that are being welded. The insulation piece 112 for each jaw is formed with a shoulder 114 which acts as a stop against studs that have already been welded to the tube, and determines the correct setting of the tool for the placement of subsequently welded studs.

The clamping arms are connected, at their ends opposite the jaws, to links 115 through the bolts 116 from which they are insulated by means of the insulation pieces 117 and 118. The links are connected together by the pin 119 and by the same means to the piston rod connector 120 at one end of the piston rod 121. The pin 119 is guided in its reciprocating movement toward and away from the tube by slot 122 in the frame 101 in order to maintain its direction of movement in alignment with the piston rod travel. Piston 123 operates within the clamping cylinder 124 which is secured to the end of the frame 101 and provided with valve 125 for selectively admitting fluid under pressure to one side or the other of piston 123 to produce the desired reciprocating movement of the piston rod.

The face stud welding mechanism which is mounted above the plate 102 includes sets of air cylinders 126 and 127, herein referred to for convenience as inner and outer cylinders, respectively, which are rigidly secured to the frame in the required angular relation to one another and with their center lines set radially of the tubes. The piston rods 128 extend through the cylinder heads at both ends, passing through front and rear stuffing boxes 129 and 130 which serve the usual purpose of sealing against the escape of the motive fluid and also insulate the piston rods from the cylinder bodies. The pistons 131 are also so constructed as to provide electrical insulation between the piston rods and the cylinder bodies, the electrical connection between the welding circuit and each rod being made through the terminal connection 132.

Copper terminals 133 are secured to the forward ends of the piston rods for the inner cylinders, and copper terminals 134 to the rods for the outer cylinders, with electrode tips 135, each with a recess 136, connected to the terminals for holding the studs to be welded. The piston rods for the two inner cylinders 126 pass through brackets 137 which form a part of the frame 101, and through the copper shoe 138 which is secured to the bracket by means of screws, but electrically insulated from the bracket by suitable insulating pieces 139 and 140. Electrical connections are made between the copper shoes 138 and the clamping arms 104 by means of laminated copper connectors 141 and 142 so that when the terminals 133 are in contact with the shoes, the current is conducted to the jaws of the side stud welding mechanism. When it is desired to have only the upper sets of electrodes in circuit, a fibre piece 143 is interposed between each copper shoe and the corresponding terminal 133 as shown in Fig. 10, the fibre insulation being secured to the stop bar 144 which is pivotally supported in the bracket 145 on the stop handle 146. In order to connect the lower electrodes with the welding circuit, the handle 146 is turned in a clockwise direction to rotate the fibre pieces from their indicated positions and thus permit the terminals 133 to make contact with the shoes 138.

In order to explain the operation of the device we will assume that we have a bare tube to which are to be welded a plurality of side studs 147 and 148 arranged in staggered rows as shown in Figures 9 and 10, and in addition a plurality of face studs 149 and 150 in some of the rows, and 151 and 152 in other rows, also in staggered relation. Studs 147 are placed in the jaw recesses 109 and the jaws clamped together to force the heads of the studs into contact with the tube; thus, with terminals 133 in contact with the shoes 138, the jaws are connected with the welding circuit and the flow of current causes a local fusion of the contacting parts to securely weld the studs to the tube, preferably at the uppermost end of the stud-covered area. This operation places two studs 147 at diametrically opposed locations on the tube. Pressure is maintained in the cylinder 124 to keep the jaws 108 in the clamping position, thus indexing and supporting the machine for the application of face studs 149 and 150 at their corresponding level. Pressure is then admitted behind the pistons 131 of inner cylinders 126 and studs 149 brought into contact with the tube, the jaws clamped on the side studs 147 offering the necessary reaction to the piston thrust to insure the desired contact pressure. As the inner electrodes 135 move forward, the contacts between terminals 133 and shoes 138 are broken, thus disconnecting the jaws 108 from the electric circuit, whereupon the fibre stop 143 is moved into place between the terminals and shoes, and maintained in that position until other side studs are to be welded. After studs 149 are welded and inner electrodes 135 retracted, pressure is admitted to the outer cylinders 127 and studs 150 welded, the jaws 108 remaining in the clamping position on the side studs 147. The device is then shifted to successive lower levels where other side studs and face studs are welded to the tube. Figure 10 shows studs already welded at a number of such levels with the welding tool in the position for welding a pair of side studs 148 and a row of face studs 151 and 152. The previously applied side stud 147 serves as an index for the positioning of side studs 148 by reason of the shoulder on insulating piece 112 being brought to bear against the stud 147. This setting of the tool is correspondingly indicated in the plan view Figure 9 where the cylinders and their associated electrodes are also automatically set for the welding of face studs 151 and 152.

Provision is made for water cooling certain parts of the device which are subjected to rather intense heating due to the high values of current required for the welding operations. For this purpose the jaws 108 are made hollow to permit the circulation of cooling water therethrough, as are also the piston rods 128, the hollow interiors of the piston rods communicating with a recess 153 in each of the electrode tips. Figure 11 indicates the various water connections utilized for this embodiment, the cooling water being supplied through a suitable connection 154 to the supply manifold 155 from which branch connections 156 and 157 lead to the water inlets 158 and 159 for the inner and outer electrodes respectively, and the branch connections 160 to the inlets 161 for the clamping jaws 108. Pipe connections 162 are made from the jaw outlets 163 to the outlet manifold 164 and other connections 165 and 166 from outlets 167 and 168 of the inner and outer electrodes respectively.

Figure 12 is a diagram showing air connections and valves required for the operation of pneumatic cylinders 126 and 127. Air under pressure is admitted through connection 169 to valve 125 for the clamping cylinder 124 and is conducted through pipe branch 170 and other connections 171 and 172 to valves 173 and 174 for the inner and outer sets of cylinders 126 and 127. An operating lever 175 for valve 125 provides for selective admission of air under pressure to the rearward side of the piston through port 176 and to the forward side of the piston through pipe 177; similarly, other operating levers 175 on valves 173 and 174 provide for selective admission of the motive fluid into one or the other sets of cylinders 126 and 127, and to one or the other side of their respective pistons, as required. The pipe connections can be readily traced from the diagram, those leading to the rearward ends of the inner cylinders being indicated at 178 and to their forward ends at 179; pipe connections to the rearward ends of the outer cylinders being indicated at 180, and to their forward ends at 181.

It has been necessary in describing the construction and operation of the several embodiments to confine the disclosures to a few selected forms of the invention which represent, however, merely specimens or examples of apparatus whereby the invention may be practiced. Numerous applications and combinations will however be found within the scope of the invention herein involved, and it is with such variations in mind that the invention is being claimed, without restriction except as required by anticipating patents or otherwise published art.

What is claimed is:

1. Apparatus for welding metallic projections to a metallic tube to form extensions on the surface thereof which includes a support adapted to be removably secured to said tube and carrying an electrode having means to receive and hold said projections, means providing for movement of said electrode with respect to said support and said tube for delivering the projections into pressure contact with the tube, and an electric circuit including said projections whereby a fusion connection is effected between each projection and said tube.

2. Apparatus for welding a plurality of members to a tube for lateral projection therefrom which includes a supporting structure adapted to be removably mounted on said tube, an electrode supported on said structure and having means to receive and hold said members, means for adjusting the position of said electrode relative to the structure while maintaining said structure in fixed relation to said tube.

3. Welding apparatus including an electrode support adapted for engagement with a tube to which projections are to be permanently secured and an electrode adjustably mounted on said support and having means to receive and hold said projections for welding attachment of said projections at spaced locations on said tube.

4. Apparatus for welding metallic extensions to a tubular member comprising a support adapted to be removably held by said member, a tool adjustably carried by said support and having means for advancing said extensions toward the tube and holding the same in pressure contact therewith, said support including an indexing device for positioning said tool with respect to the tube whereby additional extensions may be successively welded thereto in predetermined relation to previously welded extensions, and an electric welding circuit including said tool, said tube and said extensions.

5. A device for use in combination with a resistance-welding circuit for welding metallic extensions to a tubular member comprising a tool for holding said extensions in pressure contact with the tube during the application of the welding current, and tool-supporting means adapted to be secured to the tube for indexing the position of said tool whereby additional extensions may be successively welded to the tube in predetermined relation to previously welded extensions, said means including a recessed part engaged by a positioning member movable with said tool.

6. Apparatus for welding metallic projecting studs to a metallic tube including an electrode supporting structure adapted to be removably mounted on said tube, an electrode adjustably mounted on said structure, means causing said electrode to successively deliver studs into pressure contact with the tube for resistance-welded connection thereto, and means providing for angular adjustment of said electrode about the axis of said tube for positioning said studs at spaced locations circumferentially of the tube.

7. Resistance-welding apparatus including a longitudinally extending member for removable attachment to a tube in parallel relation thereto, an electrode-carrying device mounted on said member, and means associated with said member for adjusting the position of said device with respect to said tube for the welding of studs to the tube at spaced locations.

8. Welding apparatus including an electrode, a structure supporting said electrode and having portions adapted for clamping contact with a tube to which projections are to be resistance welded, means associated with said structure for positioning said electrode for the welding of projections at spaced locations circumferentially of said tube and other electrode-positioning means for the welding of additional projections at locations longitudinally spaced with respect to said circumferentially located projections.

9. A welding device adapted for the welding of studs at spaced locations on a tube, including electrodes having means for supporting said studs and operable successively in groups along convergent paths.

10. Apparatus for welding different groups of studs to a tube which includes separately operable electrodes for the welding of studs in the respective groups, means associated with an electrode for engaging a welded stud of one group to provide a thrust resisting support for a separately operable electrode during the welding of a stud in a different group.

11. A device for welding studs at spaced locations longitudinally and circumferentially of a tube, including electrodes for the welding of studs in spaced longitudinal rows and other electrodes for the welding of studs at locations intermediate said rows, and means holding said first named electrodes and studs in cooperative engagement to afford the indexing means for positioning said other electrodes for the welding of said intermediately located studs.

12. Welding apparatus comprising a pneumatic device having a hollow piston rod extending through the opposite ends of an associated cylinder, an electrode mounted at one extended end of said piston rod, and water connections at both extended ends whereby cooling water may be positively circulated through the interior of said rod and into contact with said electrode.

13. Welding apparatus which comprises a plurality of metallic cylinders each having a piston and a piston rod associated therewith, an electrode at one end of each piston rod, electrically separate connections at the opposite ends, and means insulating said pistons and the corresponding piston rods from their associated cylinders.

14. In a resistance welding device, separately operable electrodes, means connecting said electrodes with a source of electrical energy which includes an electrical connection between said electrodes, and means subjecting the continuity of said inter-electrode connection to the operation of one of the electrodes.

15. The method of utilizing separately operable electrodes for the welding of different groups of studs to a tube which comprises the welding of a stud in one group by means of one electrode and holding said stud in cooperative engagement with said corresponding electrode to position another electrode for the welding of a stud in a different group.

16. Apparatus for welding metallic extensions to a row of metallic tubes arranged in parallel including cross rails adapted to be removably attached to tubes of said row in transverse relation thereto and at spaced locations therealong, a guide bar supported by said cross rails, a welding tool carried by said guide bar and having an electrode for receiving and holding said metallic extensions, and means associated with said cross rails and guide bar for indexing the position of said electrode with respect to each of said tubes.

17. The method of utilizing an electric welding tool for welding metallic extensions to a work piece which comprises maintaining the tool and work piece in one fixed relation while moving said tool and work piece relatively in other successive relations for a selected pattern of extension application, engaging extensions by said tool and operating the welding tool in said other relations for step-by-step application of said extensions in the selected pattern form.

18. The method of utilizing an electric welding tool for welding extensions to a metallic tube which comprises supporting said tool for movement longitudinally of said tube at a fixed radial spacing therefrom and adjusting the position of said tool with respect to said tube for a selected pattern of extension application, engaging extensions by said tool and operating said tool to advance said extensions into welding contact with said tube for step-by-step application of said extensions to the tube in selected pattern form.

19. The method of utilizing an electrode carrying tool for welding metallic extensions to a plurality of metallic tubes arranged in parallel which comprises selectively maintaining a fixed relation between said tool and each of said tubes and adjustably establishing other positioning relations between said tool and individual tubes of said plurality for a selected pattern of extension application, engaging extensions by said tool and operating the tool for step-by-step application of said extensions to the tubes in selected pattern form.

20. Apparatus for welding metallic projections to a metallic tube to form extensions on the surface thereof which includes an electrode having means to receive and hold said projections, means for supporting said electrode and means providing for movement of said electrode relative to said supporting means for delivering the projections into welding pressure contact with the tube, said supporting means being adapted to provide in cooperation with said tube a means for opposing the thrust exerted by said electrode, and an electric circuit including said projections whereby a fusion connection is effected between each projection and said tube.

21. Apparatus for welding metallic projections to a metallic tube for lateral extension therefrom which comprises an electric welding tool having means for receiving said projections and being adapted to advance said projections into welding pressure contact with said tube, means forming a support for said tool and adapted to provide in cooperation with said tube a means for resisting the thrust exerted by said tool, means including said support for maintaining a predetermined spaced relation between the tool and tube while establishing other positioning relations therebetween, and means forming an electric welding circuit including said projections whereby for successive positions of said tool relative to said tube the projections are welded to said tube at spaced locations.

22. In apparatus for welding extensions to a work-piece having a curved surface, a pair of electrodes movable along convergent paths, each electrode having means for receiving an extension and adapted to deliver said extension in a direction substantially normal to said curved surface into welding pressure contact with said work-piece, means for supporting said electrodes and adapted for cooperation with said work-piece to oppose the thrust exerted by each electrode, and an electric welding circuit including each electrode and the extension carried thereby.

23. Apparatus for welding extensions to a tube at spaced locations comprising an electrode having means for receiving individual extensions and adapted to successively deliver said extensions into welding pressure contact with said tube at said locations, means for supporting said electrode and adapted to cooperate with said tube for opposing the thrust exerted by said electrode, means insulating said electrode from said supporting means, and means forming an electric welding circuit including said electrode and the extension received therein.

24. Apparatus for welding extensions to a tube at spaced locations comprising electrodes having means for receiving said extensions and adapted to deliver said extensions into welding pressure contact with said tube at said locations, means for supporting said electrodes and adapted to cooperate with said tube for opposing the thrust exerted by said electrodes, means insulating said electrodes from said supporting means, and means forming an electric welding circuit including said electrodes, said extensions and said tube.

25. In apparatus for welding extensions to a tube at spaced locations, an electrode, a structure supporting said electrode and having portions adapted to be moved into clamping position relative to said tube, means including said structure for positioning said electrode relative to said tube for welding extensions at spaced locations circumferentially thereof and other electrode-positioning means for welding additional extensions at locations longitudinally spaced with respect to said circumferentially located extensions.

26. A device for welding studs to a work-piece at spaced locations including separately operable electrodes each movable relative to said work-piece and having means for receiving a stud and advancing the same into welding pressure contact with said work-piece, means utilizing a stud already applied by one of said electrodes at one location for positioning a stud to be subsequently applied by a separately operable electrode at another location, and an electric welding circuit including said electrodes, said studs and said work-piece.

27. Apparatus for welding metallic extensions to a metallic work-piece which includes a plurality of electrodes each having means for holding an extension and adapted to deliver said extension into welding pressure contact with said work-piece, means including a pressure cylinder for actuating each electrode, means insulating each electrode from its associated cylinder, and means forming an electric welding circuit inclusive of said electrodes, said extensions and said work-piece in series.

28. Welding apparatus comprising a pneumatic device having a hollow piston rod extending through the opposite ends of an associated cylinder, an electrode mounted at one extended end of said piston rod, and means including a water connection at one extended end for maintaining a positive circulation of cooling water through the interior of said rod from end to end and in contact with said electrode.

JAMES E. TRAINER.
CRAWFORD ZIEGLER.
CLARENCE H. YEO.
WILLIAM S. JORDRE.